United States Patent
Beck et al.

(10) Patent No.: US 11,824,415 B2
(45) Date of Patent: Nov. 21, 2023

(54) COIL AND ELECTRICALLY EXCITED SYNCHRONOUS MACHINE

(71) Applicant: Bayerische Motoren Werke Aktiengesellschaft, Munich (DE)

(72) Inventors: Florian Beck, Freising (DE); Thomas Becker, Dorfen (DE); Gerd Fleischer, Prittriching (DE); Christian Kloninger, Wielenbach (DE); Daniel Loos, Munich (DE); Florian Risch, Burgthann (DE); Sefa Seyis, Mainburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 438 days.

(21) Appl. No.: 17/282,893

(22) PCT Filed: Sep. 24, 2019

(86) PCT No.: PCT/EP2019/075588
§ 371 (c)(1),
(2) Date: Apr. 5, 2021

(87) PCT Pub. No.: WO2020/078668
PCT Pub. Date: Apr. 23, 2020

(65) Prior Publication Data
US 2021/0351655 A1 Nov. 11, 2021

(30) Foreign Application Priority Data

Oct. 16, 2018 (DE) .................. 10 2018 125 567.5

(51) Int. Cl.
*H02K 3/30* (2006.01)
*H02K 15/10* (2006.01)
*H01B 3/40* (2006.01)
*H01F 5/06* (2006.01)
*C09D 163/00* (2006.01)

(52) U.S. Cl.
CPC .............. *H02K 3/30* (2013.01); *H01B 3/40* (2013.01); *H01F 5/06* (2013.01); *H02K 15/105* (2013.01); *C09D 163/00* (2013.01)

(58) Field of Classification Search
CPC .......... H02K 3/30; H02K 15/105; H01B 3/04; H01F 5/06; C09D 163/00
See application file for complete search history.

(56) References Cited

U.S. PATENT DOCUMENTS

| 3,405,100 | A | 10/1968 | Humphreys et al. | |
|---|---|---|---|---|
| 9,224,523 | B2 | 12/2015 | Muto et al. | |
| 2006/0200971 | A1* | 9/2006 | Lanoue | H01F 27/327 336/122 |
| 2008/0024256 | A1* | 1/2008 | Pauley | H01F 41/127 336/92 |
| 2015/0130318 | A1 | 5/2015 | Kitada et al. | |
| 2016/0247596 | A1 | 8/2016 | Ho et al. | |

FOREIGN PATENT DOCUMENTS

| CH | 416 591 A | 7/1966 |
|---|---|---|
| DE | 39 13 488 A1 | 10/1990 |
| DE | 10 2010 019 723 A1 | 11/2011 |
| EP | 2 230 267 A1 | 9/2010 |
| JP | 2002-118997 A | 4/2002 |
| JP | 2007-200986 A | 8/2007 |
| JP | 2018-145416 A | 9/2018 |
| WO | WO 2007/036505 A1 | 4/2007 |
| WO | WO 2013/143097 A1 | 10/2013 |
| WO | WO 2018/001671 A1 | 4/2018 |

OTHER PUBLICATIONS

International Search Report (PCT/ISA/210) issued in PCT Application No. PCT/EP2019/075588 dated Nov. 12, 2019 with English translation (six (6) pages).
German-language Written Opinion (PCT/ISA/237) issued in PCT Application No. PCT/EP2019/075588 dated Nov. 12, 2019 (five (5) pages).
German-language Search Report issued in German Application No. 10 2018 125 567.5 dated Aug. 12, 2019 with partial English translation (13 pages).
Vasiliev et al., "Mechanics and Analysis of Composite Materials", Elsevier, Dec. 31, 2001, XP040425187 (430 pages).

* cited by examiner

*Primary Examiner* — Jue Zhang
(74) *Attorney, Agent, or Firm* — Crowell & Moring LLP

(57) ABSTRACT

A coil has a winding that is coated with an epoxy resin in at least some areas, wherein a ratio of a compressive strength of the epoxy resin to the tensile strength thereof at room temperature ranges between 2 and 5, the modulus of elasticity at room temperature is at least 5000 MPa, and at a glass transition temperature of the epoxy resin, the modulus of elasticity and the tensile strength have values amounting to at least 30% of the values at room temperature.

16 Claims, No Drawings

COIL AND ELECTRICALLY EXCITED SYNCHRONOUS MACHINE

BACKGROUND AND SUMMARY OF THE INVENTION

The present invention relates to a coil, in particular a rotor or stator of an electrical machine, and to a current-excited synchronous machine.

The prior art discloses embedding, in particular, at least to some extent, encapsulating, coils, such as stators or rotors of electrical machines, into a potting composition. It is thus possible to increase the strength or stability of the entire arrangement and to influence the heat management, etc. A problem often encountered here is the adhesion of the potting composition. The different coefficients of thermal expansion of the various materials, the high operating temperatures and, in particular in the case of rotors, the high forces acting can by way of example cause separation effects in, or in general damage to, the potted component.

WO 2007/036505 A1 discloses, in this connection, a rotating electrical machine with a stator provided with windings, where a winding head of the stator is surrounded by a cast resin body, and where, between the cast resin body and a supporting body of the stator, such as a laminated core, a layer of a flexible, thermally conductive material is provided, which is intended to improve the adhesion of the cast resin body. However, the provision of such an additional layer involves costly production technology and increases the production costs.

It is therefore an object of the present invention to provide a coil and a current-excited synchronous machine which combine ideal operating performance and maximized reliability with simultaneously low production costs.

This object is achieved by a coil and by a current-excited synchronous machine according to the independent claims. Further advantages and features are apparent from the dependent claims and from the description.

DETAILED DESCRIPTION OF THE PREFERRED EMBODIMENTS

A coil comprises a winding, surrounded, in particular encapsulated, at least in some regions by an epoxy resin, where a ratio of a compressive strength of the epoxy resin to the tensile strength thereof at room temperature is between 2 and 5, where the modulus of elasticity at room temperature is at least 5000 MPa, and where, at a glass transition temperature of the epoxy resin, the modulus of elasticity and the tensile strength assume values which are at least 30% of the values at room temperature. The compressive strength is therefore advantageously adjusted or selected to be significantly higher than the tensile strength.

In a preferred embodiment, the coil is a rotor of an electrical machine, in particular of a current-excited synchronous machine, which is by way of example used as a traction motor in the motor vehicle sector. Surprisingly, it has been found here that the abovementioned ratio provides an ideal compromise, because an epoxy resin of this type, in particular also in combination with the modulus of elasticity of at least 5000 MPa, provides excellent strength values with simultaneously sufficiently high flexibility. A rotor of this type can achieve rotation rates of 17 000 revolutions per minute and more. Because, at the glass transition temperature of the epoxy resin, the modulus of elasticity and the tensile strength assume values which are at least 30% of the values at room temperature, adequate safety margins are also ensured in the high and very high load ranges.

In a preferred embodiment, the glass transition temperature is at least 150° C., with particular preference at least 180° C.

In a preferred embodiment, the modulus of elasticity at room temperature is at least 7000 or 8000 MPa, particularly preferably in a range comprising 10 000 MPa, or at least 10 000 MPa. The tensile strength is preferably at least 75 MPa and the compressive strength is at least 200 MPa. It is also preferable that, at the glass transition temperature, the compressive strength assumes values which are at least 30% of the values at room temperature. The abovementioned ratio is also advantageously between 2.5 and 4.5, or between 3 and 4.

In a preferred embodiment, the coefficient of linear thermal expansion of the epoxy resin is between that of copper and aluminum or steel. It is thus advantageously possible to reduce stresses during operation.

In particular, the coefficient of linear thermal expansion is between 10 and 23 ppm/K, with particular preference between 10 and 30 ppm/k.

In one embodiment, the compressive strength at room temperature is at least 150 MPa, with particular preferably at least 200 MPa.

It is preferable that the tensile strength at room temperature is at least 60 MPa, preferably at least 75 MPa.

As already mentioned, the modulus of elasticity at room temperature in a preferred embodiment is at least 10 000 MPa.

It is preferable that the specific fracture energy is at least 200 J/m2, preferably at least 500 J/m2.

The thermal conductivity is preferably greater than 0.5 W/(mK), preferably greater than 0.7 W/(mK), determined by way of laser flash analysis.

The epoxy resin is expediently a cycloaliphatic epoxy resin, a novolak epoxy resin or a single-component epoxy resin with a thermally activatable latent hardener.

An initial viscosity at 60° C. is preferably between 10 000 and 20 000 mPas. An initial viscosity at 90° C. is preferably between 3000 and 10 000 mPas. It is expedient to achieve gel times of below 20 minutes at 120° C.

The specific volume resistivity at 25° C. is preferably 1014 ohm*cm, while the dielectric strength is preferably between approx. 20 and 30 kV/mm.

It is preferable that any possible fillers in the epoxy resin are not electrically conductive, not magnetizable and not abrasive.

The invention also provides a current-excited synchronous machine, comprising a coil of the invention configured as rotor.

The glass transition temperature is determined in accordance with DIN 51007/ISO6721/94. The modulus of elasticity and the tensile strength are determined in accordance with ISO 527. The compressive strength is determined in accordance with ISO 604 (test on a cube with the following dimensions: 5×5×5 mm). The coefficient of linear thermal expansion is determined in accordance with DIN 51045. The specific fracture energy is determined in accordance with ISO 178. The specific volume resistivity is determined in accordance with IEC 60093. The dielectric strength is determined in accordance with IEC 60243-1.

What is claimed is:

1. A coil, comprising:
   a winding;
   an epoxy resin surrounding the winding at least in some regions, wherein a ratio of a compressive strength of the epoxy resin to tensile strength thereof at room temperature is between 2 and 5, a modulus of elasticity of the epoxy resin at room temperature is at least 5000 MPa, and at a glass transition temperature of the epoxy resin, the modulus of elasticity and the tensile strength assume values which are at least 30% of the values at room temperature.

2. The coil according to claim 1, wherein the coil is a rotor of an electrical machine.

3. The coil according to claim 1, wherein the glass transition temperature is at least 150° C.

4. The coil according to claim 3, wherein the glass transition temperature is at least 180° C.

5. The coil according to claim 1, wherein a coefficient of linear thermal expansion of the epoxy resin is between 10 and 23 ppm/K.

6. The coil according to claim 1, wherein a coefficient of linear thermal expansion of the epoxy resin is between 10 and 30 ppm/K.

7. The coil according to claim 1, wherein the compressive strength at room temperature is at least 150 MPa.

8. The coil according to claim 7, wherein the compressive strength at room temperature is at least 200 MPa.

9. The coil according to claim 1, wherein the tensile strength at room temperature is at least 60 MPa.

10. The coil according to claim 9, wherein the tensile strength at room temperature is at least 75 MPa.

11. The coil according to claim 1, wherein the modulus of elasticity at room temperature is at least 7000 MPa.

12. The coil according to claim 1, wherein a specific fracture energy of the epoxy resin is at least 200 J/m2.

13. The coil according to claim 12, wherein the specific fracture energy is at least 500 J/m2.

14. The coil according to claim 1, wherein a thermal conductivity of the epoxy resin is greater than 0.5 W/mK.

15. The coil according to claim 1, wherein the epoxy resin is a cycloaliphatic epoxy resin, a novolak epoxy resin or a single-component epoxy resin with a thermally activatable latent hardener.

16. A current-excited synchronous machine, comprising: a coil according to claim 12, wherein the coil is configured as a rotor.

* * * * *